US 9,417,686 B2

(12) United States Patent
Tsukamoto et al.

(10) Patent No.: US 9,417,686 B2
(45) Date of Patent: Aug. 16, 2016

(54) METHOD FOR CONTROLLING POWER ON A COMPUTER SYSTEM HAVING A NETWORK DEVICE AND A WAKEUP FUNCTION

(75) Inventors: Yasumichi Tsukamoto, Yamato (JP); Kohei Shibata, Fujisawa (JP)

(73) Assignee: Lenovo (Singapore) PTE LTD., Singapore (SG)

( * ) Notice: Subject to any disclaimer, the term of this patent is extended or adjusted under 35 U.S.C. 154(b) by 1411 days.

(21) Appl. No.: 12/825,577

(22) Filed: Jun. 29, 2010

(65) Prior Publication Data

US 2011/0004778 A1  Jan. 6, 2011

(30) Foreign Application Priority Data

Jul. 3, 2009  (JP) .................. 2009-159138

(51) Int. Cl.
*G06F 1/00* (2006.01)
*G06F 1/32* (2006.01)
(52) U.S. Cl.
CPC ............. *G06F 1/3278* (2013.01); *Y02B 60/126* (2013.01); *Y02B 60/32* (2013.01)
(58) Field of Classification Search
CPC ..................................... G06F 1/32; G06F 1/26
USPC ......................................... 713/320, 323, 324
See application file for complete search history.

(56) References Cited

U.S. PATENT DOCUMENTS

| 8,086,886 | B2 * | 12/2011 | Schmidt et al. | ............... 713/323 |
| 2004/0003307 | A1 * | 1/2004 | Tsuji | ............... 713/310 |
| 2004/0083388 | A1 * | 4/2004 | Nguyen | ............... 713/201 |
| 2007/0150732 | A1 * | 6/2007 | Suzuki et al. | ............... 713/168 |
| 2007/0162773 | A1 * | 7/2007 | Krantz et al. | ............... 713/300 |
| 2008/0284855 | A1 * | 11/2008 | Umeyama et al. | ......... 348/207.1 |

FOREIGN PATENT DOCUMENTS

| JP | 2003-108271 | 4/2003 |
| JP | 2003-157415 | 5/2003 |
| JP | 2003-195989 | 7/2003 |
| JP | 2004-038295 | 2/2004 |
| JP | 2007-172314 | 7/2007 |
| JP | 2008-097069 | 4/2008 |
| JP | 2009-044309 | 2/2009 |

OTHER PUBLICATIONS

Yang Xiao, WiMAX/MobileFi Advanced Research and Technology, 2007, Auerbach publications, Chapter 5.*
Alan Smith, Cache MEmories, Sep. 1982, ACM, Computing Surveys, vol. 14, No. 3, p. 1.*

* cited by examiner

*Primary Examiner* — Jaweed A Abbaszadeh
*Assistant Examiner* — Austin Hicks
(74) *Attorney, Agent, or Firm* — Antony P. Ng (57) ABSTRACT

A method for controlling power in a computer system having a network device and a wakeup function is disclosed. A determination is made whether or not the network device is in an associated state at the time when the computer system moves into a power saving mode. In response to a determination that the network device is not in the associated state, power supply is turned off from a power source to the network device. In response to a determination that the network device is in the associated state, power supply is continually provided from the power source to the network device.

16 Claims, 7 Drawing Sheets

METHOD FOR CONTROLLING POWER ON A COMPUTER SYSTEM HAVING A NETWORK DEVICE AND A WAKEUP FUNCTION

PRIORITY CLAIM

The present application claims benefit of priority under 35 U.S.C. §§120, 365 to the previously filed Japanese Patent Application No. JP2009-159138 entitled, "Information Processor, Power Control Method for Information Processor, and Computer-Executable Program" with a priority date of Jul. 3, 2009, which is incorporated by reference herein.

BACKGROUND

1. Technical Field

The present invention relates to power control in general, and in particular to a method for providing power control on a computer system having a network device and a wakeup function.

2. Description of Related Art

There has been an increasing demand, from an environmental-oriented viewpoint, to reduce power that is required while a system, such as a computer, is being powered down, particularly when the standby power is being supplied from a power supply device such as an AC adapter. According to the criteria set for Eco Mark of Japan Environment Association, effective since 2000, the power during power-down should be 1 W or less for a system including an AC adapter and having no wakeup function, and should be 3 W or less for a system having a wakeup function.

A wakeup function is a function of starting up a remote computer by turning on a computer via a remote operation. With the wakeup function, a remote computer can be turned on by an instruction from a network on the basis of an operation at a remote location, instead of being turned on manually by an operator. WAKE-ON-LAN is an example thereof, and the function allows powered-downed computers to be collectively and centrally managed.

A computer has active logic that consumes power when implementing a wakeup function based on a communication even during power-down. As a result, a computer implementing a wakeup function requires more power during power-down, as compared with a computer having no wakeup function. In the case of WAKE-ON-LAN, one of the factors responsible for the power consumption at a wakeup time is a wakeup power source $V_{aux}$ for an intended Ethernet adapter, which needs to be kept on in order to start a PC by recognizing a specific packet from a network.

One technique for reducing standby power during power-down is by using three types of control: a wakeup function set by a user; a device actually capable of implementing the wakeup function; and power supplied from an auxiliary power source only to the device that is capable of implementing the wakeup function.

Another technique allows a power supply circuit to generate a set of power sources, including a power source for a network controller, generally from DC power that is generated from AC power by an AC adaptor, but from a battery in the state where the AC power is down, and an EC/KBC controls the power supply circuit to turn off the network controller in the state where the AC power is down while the system is in a sleep or shutdown state.

SUMMARY

In accordance with a preferred embodiment of the present invention, a computer system includes a network device and a wakeup function. A determination is made whether or not the network device is in an associated state at the time when the computer system moves into a power saving mode. In response to a determination that the network device is not in the associated state, power supply is turned off from a power source to the network device. In response to a determination that the network device is in the associated state, power supply is continually provided from the power source to the network device.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
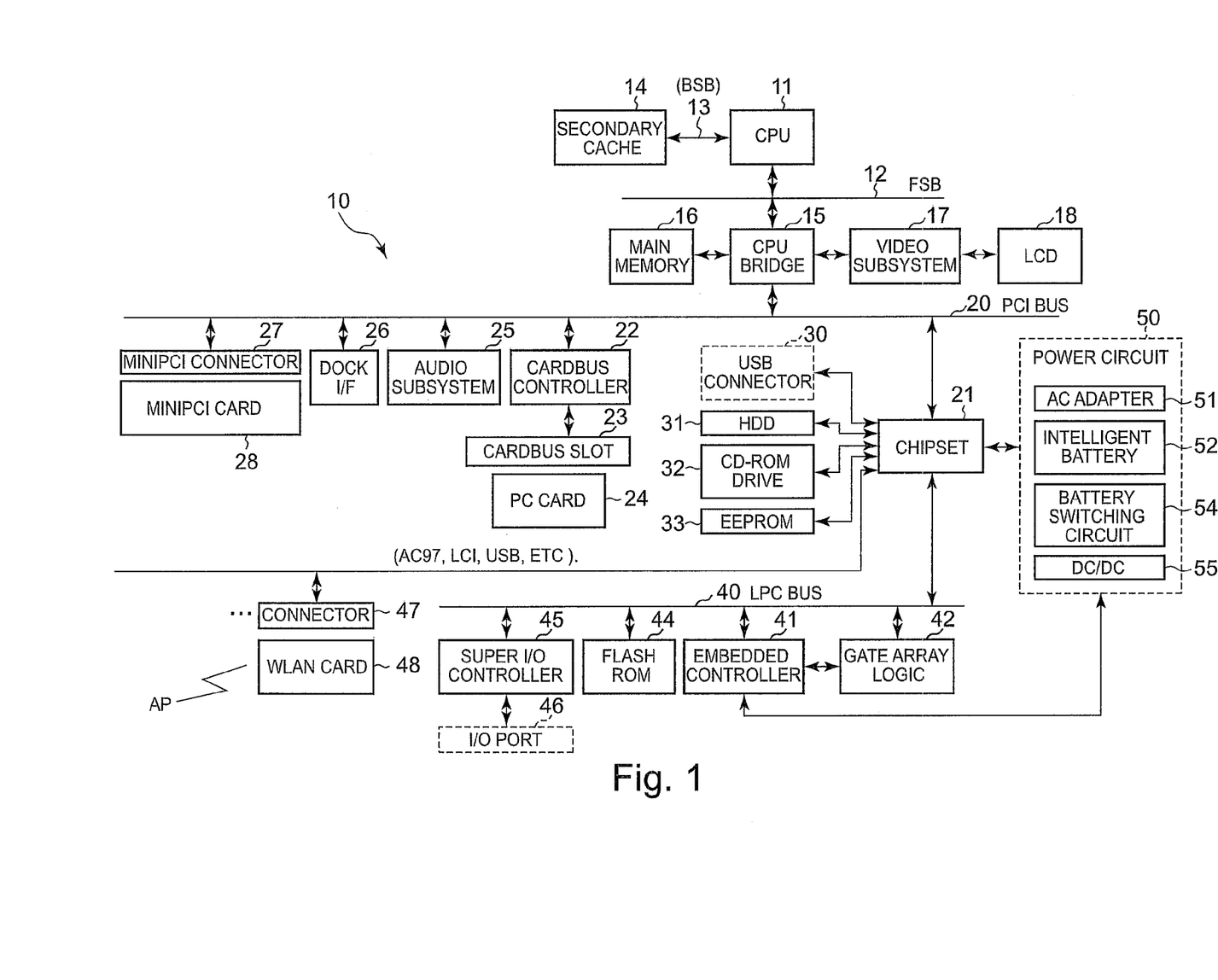
FIG. 1 is a block diagram of a computer system according to an embodiment of the present invention.

FIG. 1 is a block diagram of a computer system according to an embodiment of the present invention. As shown, a computer system 10 is configured as a notebook-type personal computer (PC) which complies with Open Architecture Developer's Group (OADG) specifications, for example, and which includes a predetermined OS. The computer system 10 complies with Intel WowLAN (Wake on Wireless LAN, and AMT as power management standard, the contents of which are incorporated herein by reference.

In the computer system 10 shown in FIG. 1, a CPU 11 functions as the "brain" of the entire computer system 10, and executes a utility program and other various programs under the control of the OS such as Windows 7. The CPU 11 is interconnected with various components via three levels of buses: an FSB (Front Side Bus) 12 which is a system bus, a Peripheral Component Interconnect (PCI) bus 20 as a bus for high-speed I/O devices, and a Low Pin Count (LPC) bus 40 as a bus for I/O devices. The CPU 11 enhances the speed of processing by storing a program code and data in a cache memory. In recent years, the CPU 11 has an SRAM of about 128 Kbytes integrated therein as a primary cache, and also has a secondary cache 14 of about 512 Kbytes to 2 Mbytes connected thereto via a dedicated bus, i.e., a Back Side Bus (BSB) 13, in order to make up for a shortage of capacity. It is noted that the secondary cache 14 may be connected to the FSB 12, in which case the BSB 13 becomes unnecessary. This can prevent the package from having many terminals, and thus reduces cost.

The FSB 12 and the PCI bus 20 are connected through a CPU bridge (host-to-PCI bridge) 15 that is called a memory/PCI chip. The CPU bridge 15 includes, among others, a memory controller function of controlling accesses to a main memory 16, and a data buffer for smoothing out the discrepancies in data transfer rate between the FSB 12 and the PCI bus 20. The main memory 16 is a writable memory to be used as an area for reading therein an executing program by the CPU 11 or as a work area for writing therein therein data processed by the executing program. For example, the main memory 16 is composed of a set of DRAM chips and has 64 MB as standard equipment, which can be increased up to 320 MB. The executing program includes firmware such as various drivers for hardware-operating the OS such as Windows 7 and the peripherals, a network application, another application program intended for a specific application, and a Basic Input/Output System (BIOS) stored in a flash ROM 44, which will be described later.

A video subsystem 17 is a subsystem for implementing functions related to video, and includes a video controller. This video controller processes a drawing instruction supplied from the CPU 11, and writes the processed drawing information into a video memory. It also reads the drawing information from the video memory so as to output it as drawing data to a liquid crystal display (LCD) 18.

The PCI bus 20 is a bus through which data can be transferred at relatively high speed, and is standardized by specifications wherein data bus width is 32 bits or 64 bits, maximum operating frequencies are 33 MHz or 66 MHz, and maximum data transfer rates are 132 MB/second or 528 MB/second. The PCI bus 20 has a chipset 21, a CardBus controller 22, an audio subsystem 25, a docking station interface (Dock I/F) 26, and a miniPCI connector 27, each connected thereto.

The CardBus controller 22 is a dedicated controller for directly connecting a bus signal of the PCI bus 20 to an interface connector (CardBus) of a CardBus slot 23 into which a PC card 24 can be loaded. The docking station interface 26 is hardware for connecting a docking station (not shown) which is an expansion unit of the computer system 10. When a laptop PC is set on the docking station, various hardware elements connected to an internal bus in the docking station are connected to the PCI bus 20 via the docking station interface 26. In addition, a miniPCI card 28 is connected to the miniPCI connector 27.

The chipset 21 has a function of bridging between the PCI bus 20 and the LPC bus 40. In addition, it has a DMA controller function, a programmable interrupt controller (PIC) function, a programmable interval timer (PIT) function, an IDE (Integrated Device Electronics) interface function, a Universal Serial Bus (USB) function, and an SMB (System Management Bus) interface function, and also incorporates a real time clock (RTC) therein.

The DMA controller function is a function of transferring data between the peripherals such as an FDD and the main memory 16 with no involvement of the CPU 11. The PIC function is a function of having a predetermined program (interrupt handler) executed in response to an interrupt request (IRQ) from the peripherals. The PIT function is a function of periodically generating a timer signal at a predetermined interval. In addition, the interface implemented by the IDE interface function has an IDE hard disk drive (HDD) 31 connected thereto, and also has a CD-ROM drive 32 connected thereto via AT Attachment Packet Interface (ATAPI). Instead of the CD-ROM drive 32, an IDE device of another type such as a Digital Versatile Disc (DVD) drive may be connected thereto. An OS such as Windows 7, various drivers, and an application program such as a network application are stored in the HDD 31. External storage devices including the HDD 31 and the CD-ROM drive 32 are stored in a storage room called a "media bay" or a "device bay" in the laptop PC proper. These external storage devices, fitted as the standard equipment, may be mounted so as to be exclusively replaceable with an FDD, a battery pack, or other apparatuses.

In addition, the chipset 21 is provided with a USB port. The USB port is connected to a USB connector 30 provided on a wall of the laptop PC, for example. Furthermore, the chipset 21 is connected with an EEPROM 33 via an SM bus. The EEPROM 33 is a memory for holding the information such as a password registered by a user, a supervisor password, a product serial number, and the like, and it is an electrically-rewritable nonvolatile memory. In addition, a set of connectors 47 are connected to the chipset 21 via an AC 97 (Audio CODEC '97) for supporting a modem function, a LAN Connect Interface (LCI) that is the interface to Ethernet built into a core chip, a USB, and the like. Each of the connectors 47 is configured to allow a communication card to be connected thereto. In the example shown in FIG. 1, a WLAN (Wireless LAN) card 48 is connected thereto.

Furthermore, the chipset 21 is connected to a power circuit 50. The power circuit 50 has an AC adapter 51 connected to commercial power supply of AC 100 V, for example, and performing analog-to-digital conversion, an intelligent battery 52 (a DC power source) as a battery (secondary battery) composed of a nickel hydrogen battery or a nickel cadmium battery which can be charged and discharged repeatedly, a battery switching circuit 54 for switching between the AC power supplied from the AC adapter 51 and the battery power supplied from the intelligent battery 52, a DC/DC converter (DC/DC) 55 for generating DC constant voltage, such as +15 V, +5 V, and +3.3 V, used by the computer system 10, and others. The intelligent battery 52 is an intelligent battery which has a CPU built therein and communicates with an embedded controller 41 (which will be described later) in compliance with standards such as Smart Battery system (SBS). According to the present embodiment, the intelligent battery 52 is configured such that it can be mounted on and removed from the system of the laptop PC as a battery pack, for example.

A core chip constituting the chipset 21 includes therein an internal register for managing a power state of the computer system 10 and logic (a state machine) for managing the power state of the computer system 10 including the operation of the internal register. This logic sends and receives various signals to and from the power circuit 50, and thereby recognizes an actual power-feeding state from the power circuit 50 to the computer system 10. The power circuit 50 controls power supply to the computer system 10 in accordance with an instruction from this logic.

The LPC bus 40 is an interface standard for connecting a legacy device to a system having no ISA bus, and sends and receives a command, an address, and data through the same four signal lines (LAD signals) on 33 MHz operation clock (for example, 8-bit data are transferred in two clocks, four bits per clock). The embedded controller 41, gate array logic 42, flash ROM 44, and a super I/O controller 45 are connected to the LPC bus 40. The LPC bus 40 is also used for connecting the peripherals which operate at a relatively low speed, such as a keyboard controller and a mouse controller. The super I/O controller 45 is connected with an I/O port 46, and controls driving of the FDD, parallel data input-output (PIO) via a parallel port, and serial data input-output (SIO) via a serial port.

The embedded controller 41 controls the keyboard (not shown), and is also connected to the power circuit 50 so as to implement part of a power management function by a power management controller (PMC) built therein, together with the gate array logic 42. The embedded controller 41 can control the power circuit 50 on the basis of power supply categories which are defined in accordance with system states. As the system states (ACPI states), there are six states of S0 to S5 defined as follows; S0: full operation state; S1: low power consumption state; S2: low power consumption state; S3: standby state; S4: hibernate state; and S5: power-off by software.

In S0, the CPU is ON (Windows is ON, the BIOS is ON, and the network application is ON), the memory is ON, the chipset is ON, the WLAN card is ON, and the embedded controller is ON. In S3, the CPU is OFF (Windows is OFF, the BIOS is OFF, and the network application is OFF), the memory is ON, the chipset is ON, the WLAN card is ON, and the embedded controller is ON. In S4 and S5, the CPU is OFF (Windows is OFF, the BIOS is OFF, and the network application is OFF), the memory is OFF, the chipset is ON, the WLAN card is ON, and the embedded controller is ON.

The states S3 through S5 are referred to as a power saving mode of the device, and represented as Sx state. The embedded controller 41, the gate array logic 42, and the chipset 21 are configured to be able to operate even during the power saving mode for controlling the power circuit 50 in the Sx state. The embedded controller 41, the gate array logic 42, and the chipset 21 constitute the power control means of the present invention.

Figure 2:
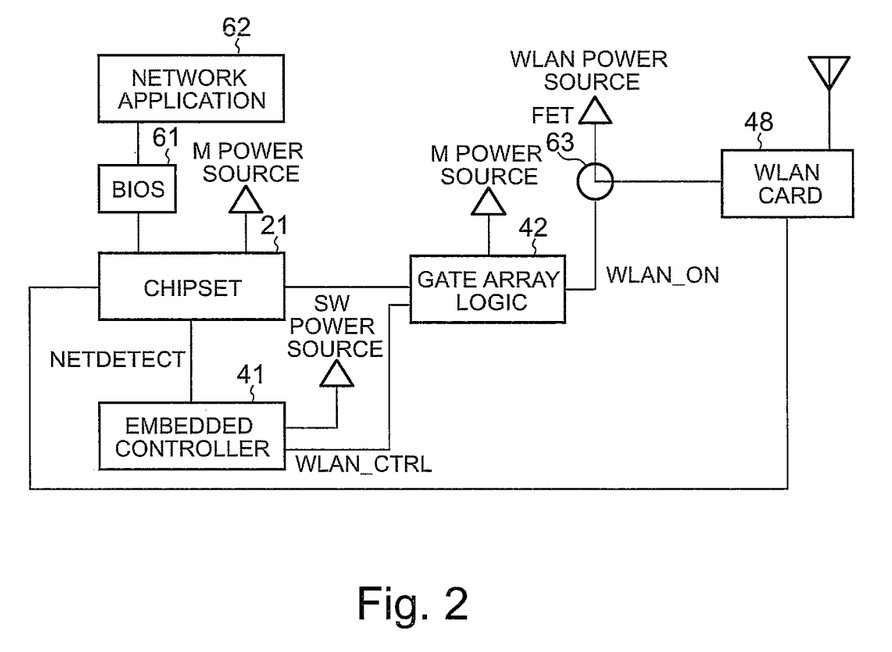
FIG. 2 is a block diagram illustrating a hardware configuration for power control of a WLAN card.

FIG. 2 is a block diagram illustrating a hardware configuration for power control of a WLAN card. The WLAN card 48 is configured to comply with Intel Wake on Wireless LAN, and performs radio communication with other STAs (stations) via an AP (access point). A network application 62 is application software for controlling the operation of the WLAN card 48. When the wakeup function is active, the embedded controller 41 controls the power circuit 50 via the gate array logic 42 to supply power to a part of the computer system 10 that requires the power. The M power source and the SW power source of the power circuit 50 are ON through the S0 to S5 states. The WLAN power source of the power circuit 50 is turned on/off in the following manner.

When the state is changed from S0 to Sx, the network application 62 checks an associated/non-associated state of the WLAN card 48, and notifies the BIOS 61 of the result. In the case where the WLAN card 48 is in the associated state upon transition from S0 to Sx state, the BIOS 61 instructs the embedded controller 41 to set WLAN_CTRL=High, while in the case where the WLAN card 48 is not in the associated state, it instructs the embedded controller 41 to set WLAN_CTRL=Low.

When the state is changed from S0 to Sx, the embedded controller 41 controls the power supply to the WLAN card 48 in accordance with an instruction from the BIOS 61. Specifically, in the case where the WLAN card 48 is in the associated state upon transition from S0 to Sx state, the embedded controller 41 outputs WLAN_CTRL=High to the gate array logic 42, so as to turn on the power supply to the WLAN card 48. In the case where the WLAN card 48 is not in the associated state, the embedded controller 41 outputs WLAN_CTRL=Low to the gate array logic 42, so as to turn off the power supply to the WLAN card 48.

On the other hand, during the Sx state, the embedded controller 41 polls NETDETECT via the chipset 21, and controls the power supply to the WLAN card 48 in accordance with an associated/non-associated state of the WLAN card 48 that is received from the chipset 21. In the case where the WLAN card 48 is in the associated state, the embedded controller 41 outputs WLAN_CTRL=High to the gate array logic 42, so as to turn on the power supply to the WLAN card 48. In the case where the WLAN card 48 is not in the associated state, the embedded controller 41 outputs WLAN_CTRL=Low to the gate array logic 42, so as to turn off the power supply to the WLAN card 48.

The chipset 21 checks an associated/non-associated state of the WLAN card 48 during the Sx state, and notifies the embedded controller 41 of the result.

The gate array logic 42 turns on/off the power supply to the WLAN card 48 in accordance with the WLAN_CTRL value received from the embedded controller 41. Specifically, the gate array logic 42 switches a FET 63 that turns on/off the power supply to the WLAN card 48. When receiving WLAN_CTRL=High from the embedded controller 41, the gate array logic 42 sets WLAN_ON=High to turn the FET 63 on, to thereby turn on the power supply to the WLAN card 48. On the other hand, when receiving WLAN_CTRL=Low from the embedded controller 41, the gate array logic 42 sets WLAN_ON=Low to turn the FET 63 off, to thereby turn off the power supply to the WLAN card 48.

Figure 3:
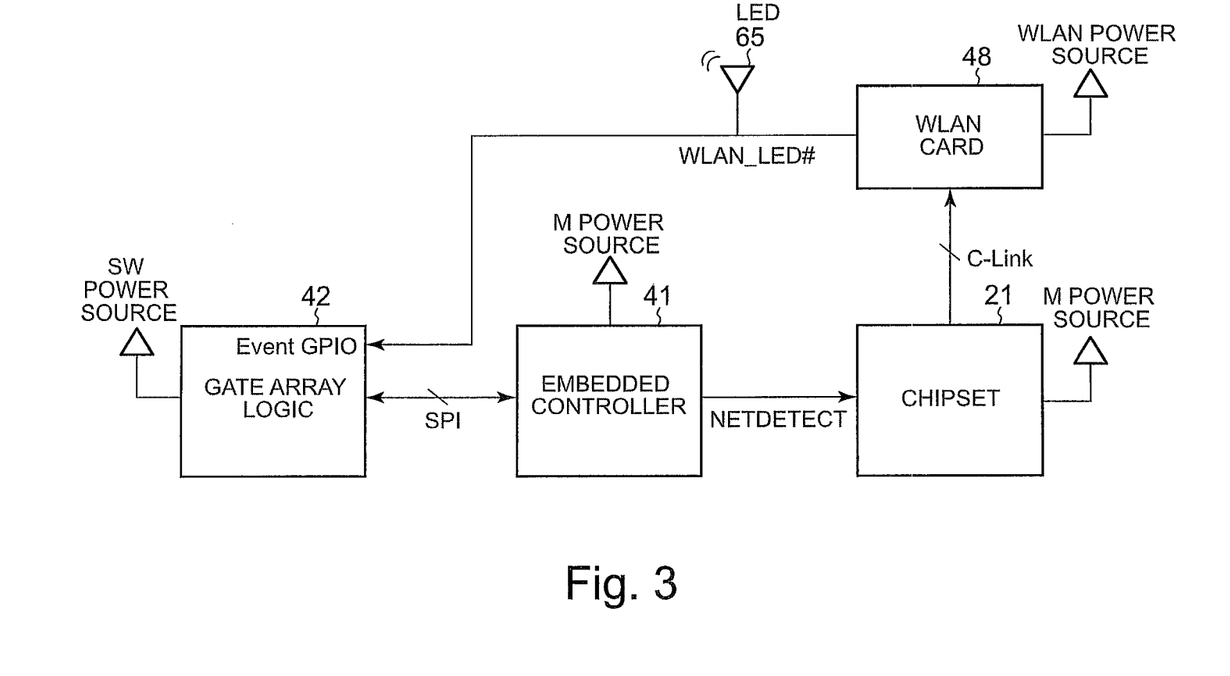
FIGS. 3-4 illustrate how an embedded controller detects a change from an associated state to a non-associated state.
Figure 4:
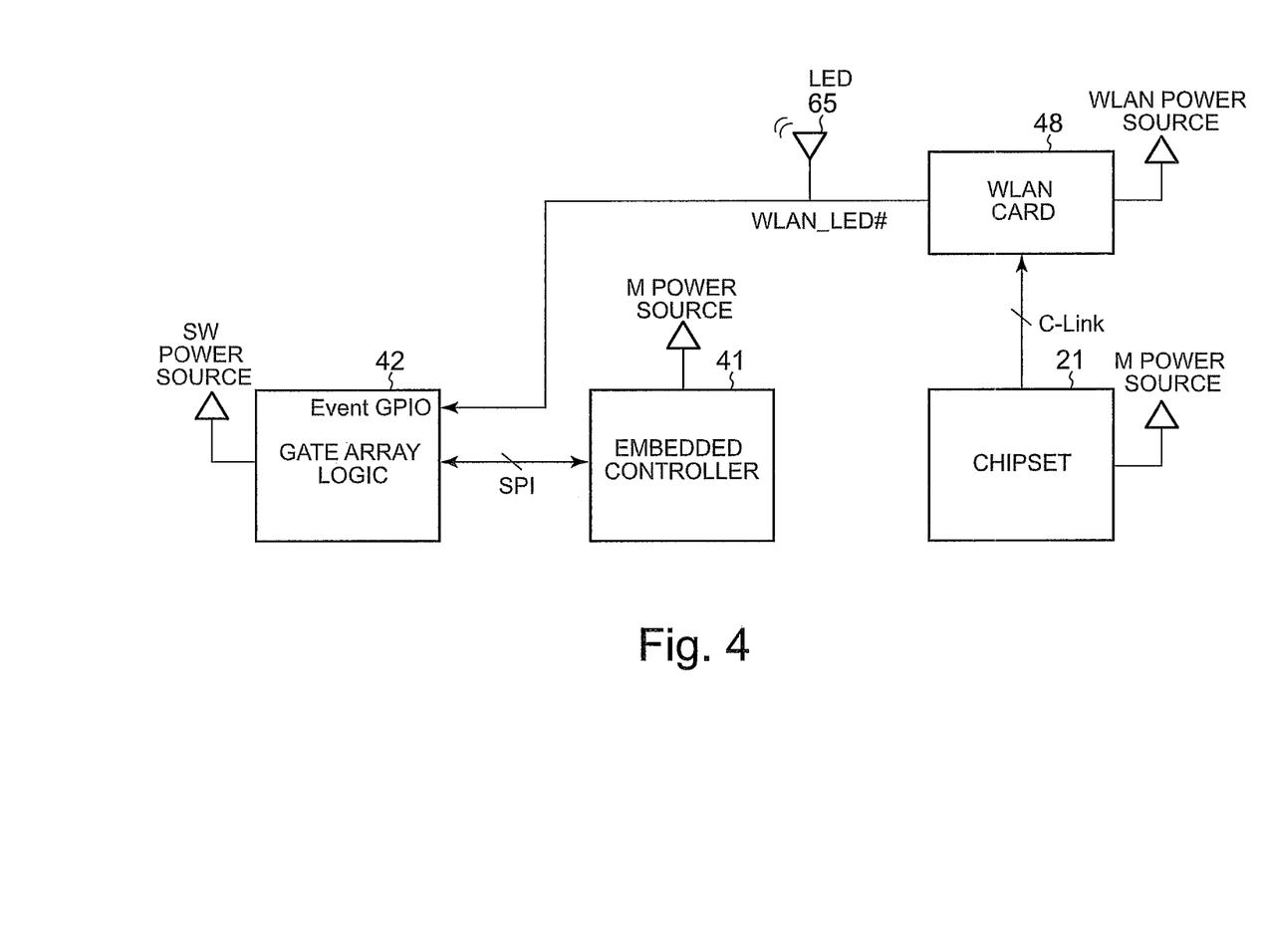

FIGS. 3 and 4 are block diagrams illustrating, by way of example, how the embedded controller detects a change from an associated state to a non-associated state. Referring to FIG. 3, the WLAN card 48 includes an LED 65. WLAN_LED# (which is "Low" in the associated state and "High" in the non-associated state) indicating the on/off state of the LED 65 is output to the embedded controller 41 via the gate array logic 42. When NETDETECT indicates that it is no longer in the associated state, the WLAN card 48 turns the LED 65 off. The embedded controller 41, when detecting that the value of WLAN_LED# is fixed to High, detects the non-associated state.

In FIG. 4, the embedded controller 41 monitors WLAN_LED#, and, when detecting that the LED 65 is off for a period longer than a predetermined period, detects the non-associated state.

Figure 5:
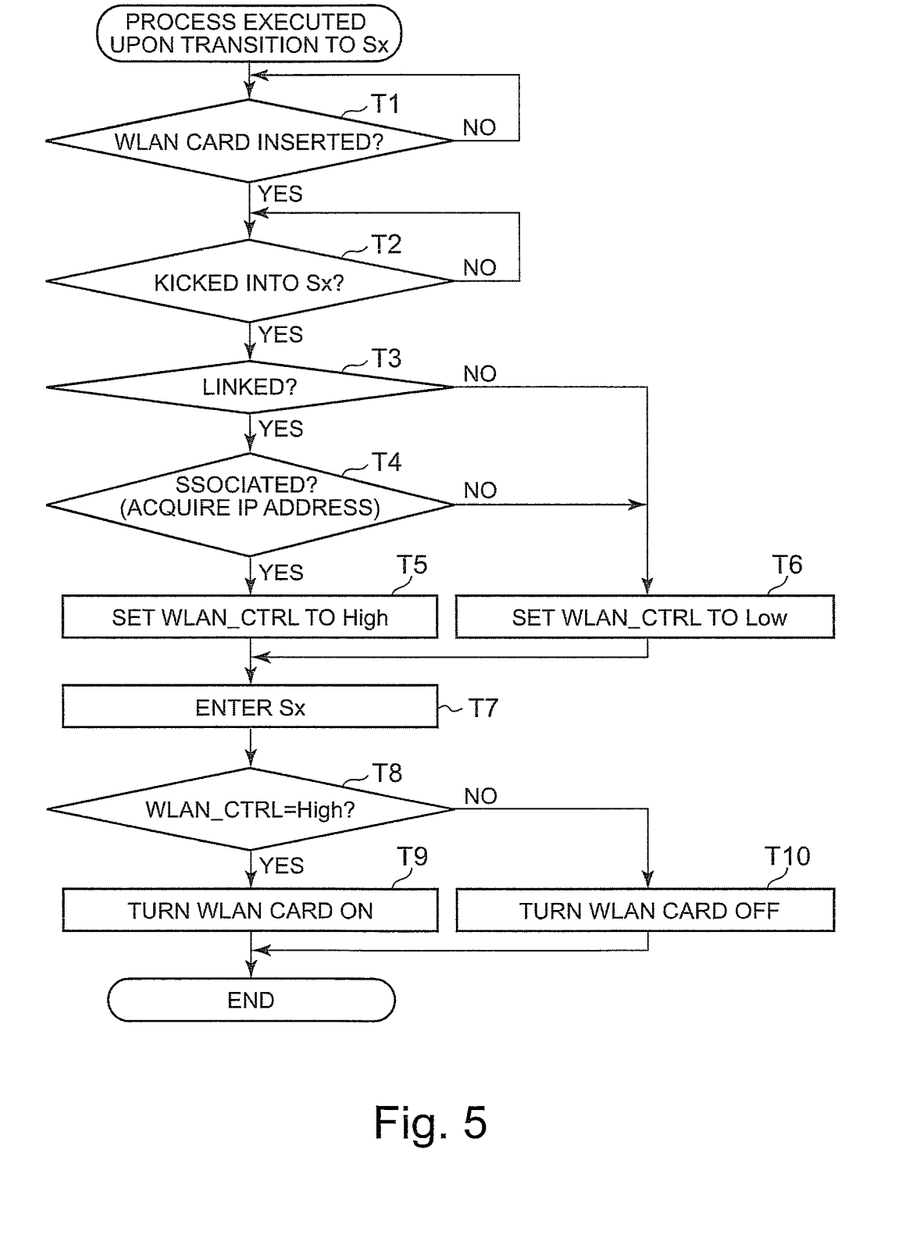
FIG. 5 is a flowchart illustrating a process executed when the system state is changed from S0 to Sx in the hardware configuration shown in FIG. 2.

FIG. 5 is a flowchart illustrating a process that is executed when the system state is changed from S0 to Sx in the hardware configuration shown in FIG. 2. Referring to FIG. 5, the network application 62 firstly determines whether the WLAN card 48 has been inserted (step T1). If the WLAN card 48 has been inserted ("Yes" in step T1), the network application 62 determines whether the system state has been kicked into Sx (step T2). If it has been kicked into S3 ("Yes" in step T2), the network application 62 determines whether the WLAN card 48 is linked to an AP (access point) (step T3). If the WLAN card 48 is not linked to an AP ("No" in step T3), the network application 62 notifies the BIOS 61 to that effect, and the process proceeds to step T6. On the other hand, if the WLAN card 48 is linked to an AP ("Yes" in step T3), the network application 62 determines whether the WLAN card 48 is associated with the AP (step T4). If it is not associated with the AP ("No" in step T4), the network application 62 notifies the BIOS 61 to that effect, and the process proceeds to step T6. On the other hand, if the WLAN card 48 is associated with the AP ("Yes" in step T4), the network application 62 notifies the BIOS 61 to that effect, and the process proceeds to step T5.

In step T5, the BIOS 61 outputs to the embedded controller 41 an instruction to set WLAN_CTRL to High. On the other hand, in step T6, the BIOS 61 outputs to the embedded controller 41 an instruction to set WLAN_CTRL to Low.

Thereafter, the BIOS 61 enters the Sx state (step T7). The embedded controller 41 then determines whether WLAN_C-

TRL is High (step T8). If WLAN_CTRL is High ("Yes" in step T8), the embedded controller 41 turns the WLAN card 48 on (step T9). If WLAN_CTRL is not High ("No" in step T8), i.e. in the case of WLAN_CTRL=Low, it turns the WLAN card 48 off (step T10).

It is noted that the above-described steps T4 to T6 may be configured as follows. In the associated state, if an IP address acquired is the same as the IP address registered in advance, WLAN_CTRL may be set to High, whereas if it is different from the pre-registered IP address, WLAN_CTRL may be set to Low. Alternatively, in the associated state, if an SSID (i.e., an identifier of the access point) being connected is the same as the SSID registered in advance, WLAN_CTRL may be set to High, whereas if it is different from the pre-registered SSID, WLAN_CTRL may be set to Low.

Figure 6:
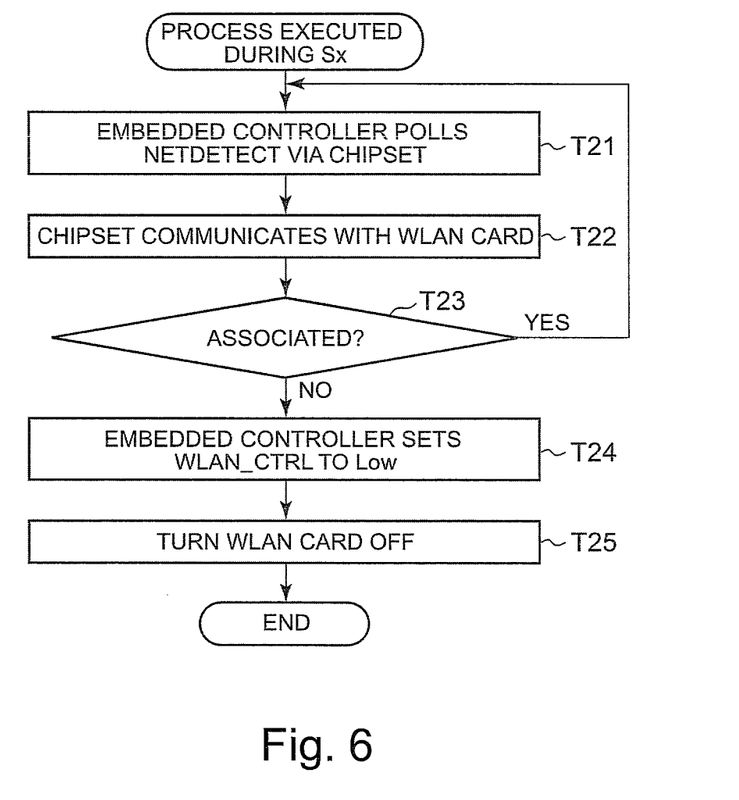
FIG. 6 is a flowchart illustrating a process executed during the Sx state in the hardware configuration shown in FIG. 2.

FIG. 6 is a flowchart illustrating a process that is executed during the Sx state in the hardware configuration shown in FIG. 2. Referring to FIG. 6, the embedded controller 41 polls NETDETECT via the chipset 21 (step T21). The chipset 21 communicates with the WLAN card 48 (step T22). The embedded controller 41 determines whether the WLAN card 48 is in an associated state (step T23). If the WLAN card 48 is associated ("Yes" in step T23), the process returns to step T21. On the other hand, if the WLAN card 48 is not associated ("No" in step T23), the embedded controller 41 sets WLAN_CTRL to Low (step T24), and turns the WLAN card 48 off (step T25).

It is noted that, in the above-described steps T23 and T24, WLAN_CTRL may be set to Low if the IP address acquired in the associated state is different from the IP address registered in advance.

Figure 7:
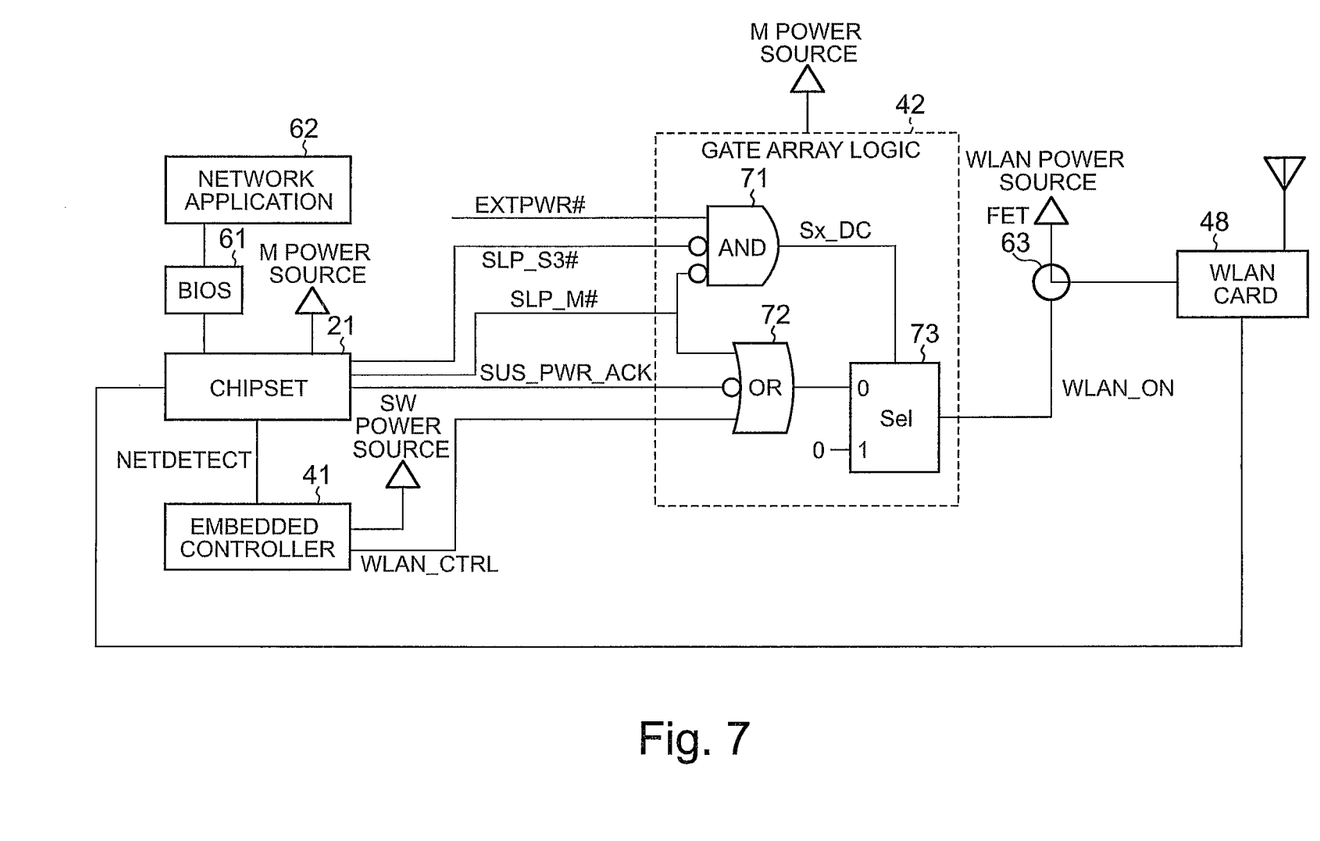
FIG. 7 shows a modification of the hardware configuration for power control of the WLAN card.

FIG. 7 shows a modification of the hardware configuration for power control of the WLAN card. FIG. 7 shows a configuration in which the power supply to the WLAN card 48 is turned off under the conditions of Sx state and DC power supply (i.e., battery-operated). In FIG. 7, the portions having the functions equivalent to those in FIG. 2 are denoted by like symbols, and description of the common parts will not be provided here. The gate array logic 42 includes an AND gate 71, an OR gate 72, and a selector 73. The chipset 21 outputs SLP_S3# ("High" in the case of S0 and "Low" in the case of Sx) to the AND gate 71, outputs SLP_M# ("High" in the case of S0, "Low" in the case of Sx, and "High" in the case of Sx@AMT) to the AND gate 71 and the OR gate 72, outputs SUS_PWR_ACK ("High" in the case of NonAMT, "Low" in the case of AMT, and "Low" in the case of MEWOL) to the OR gate 72.

The AND gate 71 performs AND operation of EXTPWR# that is input from logic (not shown) ("High" in the case of AC and "Low" in the case of DC), the inverting input of SLP_S3#, and the inverting input of SLP_M#, and outputs to the selector 73 a result of the AND operation as Sx_DC ("High" in the case of Sx and Dc; otherwise "Low"). The OR gate 72 performs OR operation of SLP_M#, the inverting input of SUS_PWR_ACK, and WLAN_CTRL, and outputs a result of the OR operation to the "0" terminal of the selector 73.

The selector 73 receives the output from the OR gate 72 at the "0" terminal, and receives 0 (zero) at the "1" terminal. The selector 73 outputs, as WLAN_ON, the input received at the "1" terminal in the case where Sx_DC="High", and the input received at the "0" terminal in the case where Sx_DC="Low". That is, the power supply to the WLAN card 48 is turned off under the conditions of Sx state and DC power supply.

As described above, according to the present embodiment, the embedded controller 41 determines whether the WLAN card 48 is in an associated state at the time when the system state is changed to Sx. If the WLAN card 48 is not in the associated state, the embedded controller 41 turns off the power supply from a power source to the WLAN card 48. On the other hand, if the WLAN card 48 is in the associated state, the embedded controller 41 continues the power supply from the power source to the WLAN card 48. This can reduce the power consumed by the WLAN card 48, resulting in further reduction of the standby power.

During the Sx state, it is determined whether the WLAN card 48 is in the associated state, and if it is not in the associated state, the power supply from the power source to the WLAN card 48 is turned off. That is, when the WLAN card 48 attains the non-associated state during the Sx state, the power supply to the WLAN card 48 is turned off, whereby the standby power can further be reduced.

The power source includes the AC power source and the DC power source (i.e., the battery). In the state where the information processor is being driven by the DC power, when the information processor moves into the Sx state or it is in the Sx state, power supply to the WLAN card 48 can be turned off. This can reduce the loss of the battery life.

According to a preferred embodiment of the present invention, upon transition to the Sx state or during the Sx state, when an IP address acquired in the associated state is different from the IP address registered in advance, the power supply to the WLAN card 48 can be turned off. That is, when the WLAN card 48 is associated with an AP other than the AP registered in advance, the power supply to the WLAN card 48 can be turned off, to thereby reduce the standby power.

As has been described, the present invention provides a computer system having a wakeup function.

It is also important to note that although the present invention has been described in the context of a fully functional computer, those skilled in the art will appreciate that the mechanisms of the present invention are capable of being distributed as a computer program product in a variety of computer-readable storage medium such as CD ROMs.

While the invention has been particularly shown and described with reference to a preferred embodiment, it will be understood by those skilled in the art that various changes in form and detail may be made therein without departing from the spirit and scope of the invention.

What is claimed is:

1. A computer system comprising:
   a processor;
   a system memory for storing contents;
   a cache memory for storing a subset of said contents, wherein said system memory and said cache memory are coupled to said processor;
   a keyboard;
   a network device for handling wireless communications;
   a power source for supplying power to said processor, said system memory, said cache memory and said network device; and
   a power control module for controlling said power source, wherein said power control module determines whether or not said network device is already in an associated state at the time when said computer system begins to enter a power saving mode, wherein said computer is capable of being waken up by a wakeup function via said network device when said network device is in said associated state, wherein said power control module turns off power supply from said power source to said network device if said network device is not already in said associated state when said computer system begins to enter said power saving mode, and said power control module continues power supply from said power source to said network device when said network device is already in said associated state when said computer system begins to enter said power saving mode.

2. The computer system of claim 1, wherein said power control module determines whether or not said network device is in said associated state at the time when said computer system is in said power saving mode, and said power control module turns off power supply from said power source to said network device if said network device is not in said associated state.

3. The computer system of claim 1, wherein said power source includes an AC power source and a DC power source, and if said computer system is being driven by said DC power source, said power control module turns off power supply from said power source to said network device when said computer system moves into said power saving mode or during the time when said computer system is in said power saving mode.

4. The computer system of claim 1, wherein at the time when said computer system moves into said power saving mode or during the time when said computer system is in said power saving mode, said power control module turns off power supply from said power source to said network device if an IP address acquired in said associated state is different from an IP address registered in advance.

5. The computer system of claim 1, wherein at the time when said computer system moves into said power saving mode or during the time when said computer system is in said power saving mode, said power control module turns off power supply from said power source to said network device if an SSID being connected is different from an SSID registered in advance.

6. The computer system of claim 1, wherein said network device is a wireless LAN device.

7. A method for controlling power in a computer system having a network device and a wakeup function, said method comprising:
   determining whether or not said network device is already in an associated state at the time when said computer system begins to enter into a power saving mode, wherein said computer is capable of being waken up by a wakeup function via said network device when said network device is in said associate state;
   in a determination that said network device is not already in said associated state when said computer system begins to enter into said power saving mode,
   turning off power supply from said power source to said network device; and
   in a determination that said network device is already in said associated state when said computer system begins to enter into said power saving mode,
   continuing power supply from said power source to said network device.

8. The method of claim 7, wherein said method further includes
   determining whether or not said network device is in said associated state at the time when said computer system is in said power saving mode; and
   turning off power supply from said power source to said network device if said network device is not in said associated state when said computer system is in said power saving mode.

9. The method of claim 7, wherein said power source includes an AC power source and a DC power source, and wherein said method further includes turning off power supply from said power source to said network device when said computer system moves into said power saving mode or during the time when said computer system is in said power saving mode, if said computer system is being driven by said DC power source.

10. The method of claim 7, wherein said method further includes, at the time when said computer system moves into said power saving mode or during the time when said computer system is in said power saving mode, turning off power supply from said power source to said network device if an IP address acquired in said associated state is different from an IP address registered in advance.

11. The method of claim 7, wherein said method further includes, at the time when said computer system moves into said power saving mode or during the time when said computer system is in said power saving mode, turning off power supply from said power source to said network device if an SSID being connected is different from an SSID registered in advance.

12. A non-transitory machine-readable device for controlling power in a computer system having a network device and a wakeup function, said non-transitory machine-readable device comprising:
   program code for determining whether or not said network device is already in an associated state at the time when said computer system begins to enter into a power saving mode, wherein said computer is capable of being waken up by a wakeup function via said network device when said network device is in said associate state;
   program code for determining that said network device is not already in said associated state when said computer system begins to enter into said power saving mode, turning off power supply from said power source to said network device;
   and program code for determining that said network device is already in said associated state when said computer system begins to enter into said power saving mode, continuing power supply from said power source to said network device.

13. The machine-readable device of claim 12, wherein said machine-readable device further includes
   program code for determining whether or not said network device is in said associated state at the time when said computer system is in said power saving mode; and
   program code for turning off power supply from said power source to said network device if said network device is not in said associated state when said computer system is in said power saving mode.

14. The machine-readable device of claim 12, wherein said power source includes an AC power source and a DC power source, and wherein said machine-readable device further includes program code for turning off power supply from said power source to said network device when said computer system moves into said power saving mode or during the time when said computer system is in said power saving mode, if said computer system is being driven by said DC power source.

15. The machine-readable device of claim 12, wherein said machine-readable device further includes, at the time when said computer system moves into said power saving mode or during the time when said computer system is in said power saving mode, program code for turning off power supply from said power source to said network device if an IP address acquired in said associated state is different from an IP address registered in advance.

16. The machine-readable device of claim 12, wherein said machine-readable device further includes, at the time when said computer system moves into said power saving mode or during the time when said computer system is in said power saving mode, program code for turning off power supply from said power source to said network device if an SSID being connected is different from an SSID registered in advance.

\* \* \* \* \*